United States Patent
Poplawski

[11] 3,831,658
[45] Aug. 27, 1974

[54] TIRE REMOVAL MEANS

[75] Inventor: Eugene M. Poplawski, Aurora, Ill.

[73] Assignee: Caterpillar Tractor Co., Peoria, Ill.

[22] Filed: Sept. 17, 1973

[21] Appl. No.: 397,668

[52] U.S. Cl.................. 152/427, 152/396, 152/398
[51] Int. Cl............................................. B60c 29/00
[58] Field of Search .......... 152/396, 397, 398, 409, 152/415, 427; 301/63 D, 63 DS

[56] References Cited
UNITED STATES PATENTS

| | | | |
|---|---|---|---|
| 1,382,672 | 6/1921 | Racer | 301/63 D |
| 1,471,812 | 10/1923 | Teevin | 301/63 DS |
| 1,560,345 | 11/1925 | Friend | 152/396 |
| 2,106,421 | 1/1938 | Cox | 152/396 |
| 2,871,905 | 2/1959 | Stanton | 152/427 |
| 3,155,429 | 11/1964 | Metzler | 152/427 |

Primary Examiner—Drayton E. Hoffman
Attorney, Agent, or Firm—Phillips, Moore, Weissenberger Lempio & Strabala

[57] ABSTRACT

An inflated tire mounted on a two-piece rim includes a lock member which normally blocks off access to the bolts fastening the two-piece rim together. The lock member may be removed to allow access to such bolts only upon removal of a sealing cap which allows the tire to deflate into a condition safe for the disassembly of such rim parts, to allow removal of the tire therefrom.

6 Claims, 4 Drawing Figures

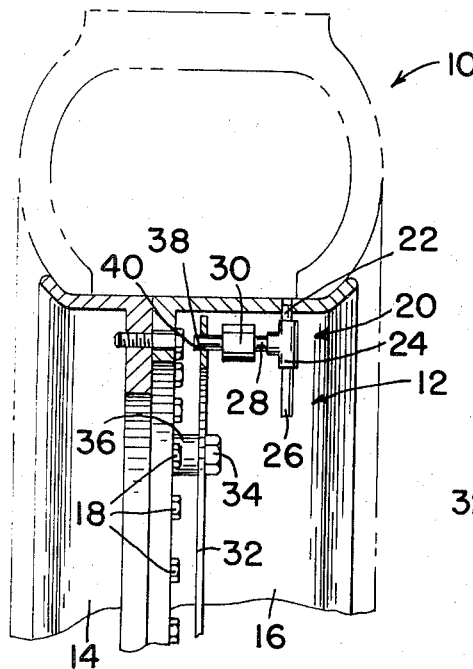
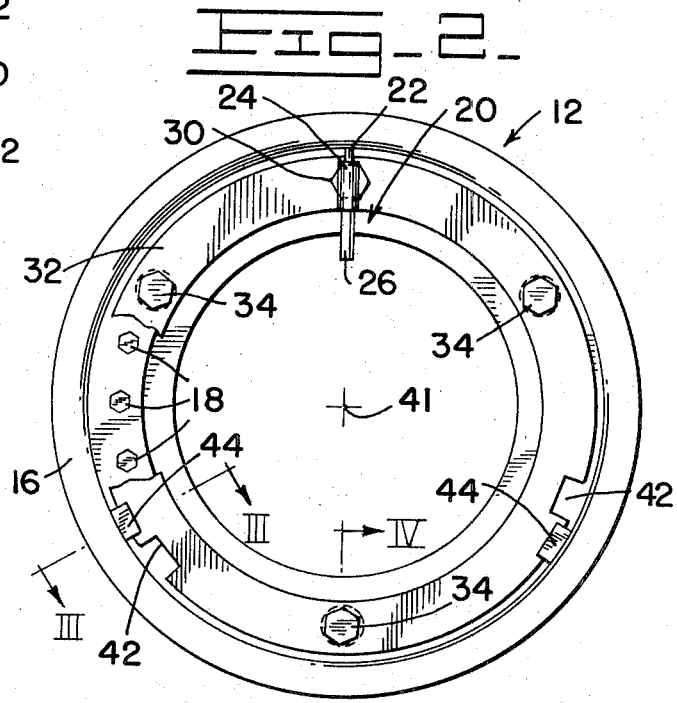
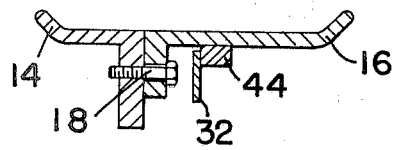
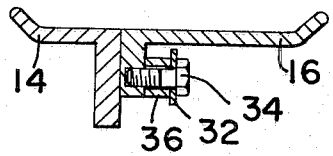

TIRE REMOVAL MEANS

BACKGROUND OF THE INVENTION

This invention relates to apparatus for insuring a safe condition for removal of a tire from a split rim, and more particularly, to such an apparatus which requires that the tire be placed in a deflating state before the rim portions of the split rim can be disassembled.

Certain earthworking or earthmoving vehicles employ air-filled tired wheels as a means of conveying the machine during operation thereof. Such tires are commonly mounted on rims of the split, or two-piece type, wherein the two pieces are bolted together. The tire normally is removed from such a split-rim assembly by disassembling the two pieces of the rim, and removing the tire therefrom.

It is not uncommon that a tire used in such earthworking will become badly worn or punctured so that it must be removed in the field, and carried to a repair facility.

It has been found that, with the tire in an inflated state, the disassembly of the rim portions can cause great injury to one undertaking such operation. Consequently, it is extremely desirable that such rim portions be disassembled only with the tire in a deflated state. To insure that such condition is achieved, in order to protect the operator from injury, it will be understood that it would be extremely desirable to provide means which insure that the rim assembly cannot be disassembled unless the tire is in a deflated condition.

Of general interest in this area are U.S. Pat. No. 3,049,162 to Rosenbaum et al, U.S. Pat. No. 3,236,278 to Gailiard, and U.S. Pat. No. 3,244,217 to King.

SUMMARY OF THE INVENTION

It is an object of this invention to provide means for providing that a rim assembly can be disassembled, and a tire mounted thereon removed therefrom, only with the tire in a deflating or a deflated state.

It is a further object of this invention to provide means which, while fulfilling the above objects, are extremely simple in design and operation.

Broadly stated, the invention is in combination with an inflatable tire mounted on a rim assembly comprising two rim portions, and fastener means removably securing the two rim portions together, the tire being seated on both rim portions of the rim assembly, and means for selectively allowing deflation of the tire from an inflated state. The improvement in combination with such structure comprises means associated with (i) the means for selectively allowing deflation of the tire from an inflated state and (ii) the rim assembly, for providing that the two rim portions of the rim assembly may be disassembled only upon actuation of the means for allowing deflation of the tire.

BRIEF DESCRIPTION OF THE DRAWINGS

These and other objects of the invention will become apparent from a study of the following specification and drawings, in which:

FIG. 1 is a fragmentary sectional view of a tire and rim assembly incorporating the invention;

FIG. 2 is a side elevation, partially broken away, of the rim assembly associated with the invention;

FIG. 3 is a sectional view taken along the line III—III of FIG. 2; and

FIG. 4 is a sectional view taken along the line IV—IV of FIG. 2.

DESCRIPTION OF THE PREFERRED EMBODIMENT

Referring to the drawings, a tire 10 is shown mounted on a rim assembly 12. The rim assembly is made up of two portions 14,16 bolted together by a plurality of removable bolts 18, the tire being seated on both rim portions 14,16. The bolts 18, it will be seen, are disposed in substantially circular pattern. The tire 10 is inflatable through a stem assembly 20, made up of an air line portion 22 fixed to the rim portion 16, a conventional T member 24, a conventional air inlet stem 26, an air line portion 28, and a sealing cap 30.

A lock ring 32 of circular configuration is fixed to the rim portion 16 by means of bolts 34 disposed through apertures in the lock ring 32 and spacers 36. In such position, the lock ring 32 substantially blocks access to the bolts 18. Sealing cap 30 defines an extended portion 38 which penetrates into an aperture 40 defined by the lock ring 32, so that even upon removal of bolts 34, the lock ring 32 is substantially held from rotation about its axis 41 relative to the rim portion 16.

The lock ring 32 defines notches 42 which, with the lock ring 32 held from such rotation in such position, are spaced from lug members 44 which are fixed to the rim portion 16, so that the lug members 44 are positioned so that the lock ring 32 is held in a position shielding the bolts 18.

It will be understood that, upon removal of the bolts 34, and removal of the sealing cap 30 from air line portion 28, the lock member 32 may be rotated about its axis 41 relative to the rim portion 16 so that the notches 42 register with the lug members 44, allowing removal of the lock member 32 from the rim assembly 16. Thus, the bolts 18 become accessible only upon removal of the lock member 32, which can only occur upon removal of the sealing cap 30, allowing deflation of the tire 10 from its inflated state. Thus, the relatively safe state of a deflated tire must be achieved before the rim portions 14,16 can be separated, allowing removal of the tire 10.

It will be noted that, after mounting of the tire on the rim portions 14,16 and the reassembly of such rim portions, the lock ring 32 is repositioned so that the extended portion 38 of seal cap 30 again cooperates with the aperture 40 defined by the lock ring 32, so that the tire 10 can be properly inflated.

It will be understood that, while the tire 10 is shown as of the tubeless type, such invention may also of course be used with a tire of the tube type, wherein the air line portion 22 communicates with the tube.

What is claimed is:

1. In combination with an inflatable tire mounted on a rim assembly comprising two rim portions, and fastener means removably securing the two rim portions together, the tire being seated on both rim portions of the rim assembly, and means for selectively allowing deflation of the tire from an inflated state, the improvement which comprises means associated with (i) the means for selectively allowing deflation of the tire from an inflated state and (ii) the rim assembly, for providing that the two rim portions of the rim assembly may be disassembled only upon actuation of the means allowing deflation of the tire.

2. The combination of claim 1 wherein the means associated with (i) the means for selectively allowing deflation of the tire from an inflated state and (ii) the rim assembly comprise a lock member substantially blocking access to the fastener means with the tire in an inflated state, and means allowing removal of said lock member to allow access to the fastener means only upon actuation of the means allowing deflation of the tire.

3. The combination of claim 2 wherein the lock member is movable to a first position relative to one of the rim portions, to substantially block access to the fastener means, and is held substantially in said first position by the means allowing removal of said lock member only upon acutation of the means allowing deflation of the tire, and wherein the lock member is movable to a second position relative to said one of the rim portions to allow removal thereof to allow access to said fastener means, the means allowing removal of the lock member no longer positioning and holding the lock member in said first position, and allowing said lock member to be moved to said second position.

4. The combination of claim 3 wherein the means for selectively allowing deflation of the tire from an inflated state comprise air line means positioned relative to the rim assembly, and a sealing cap removably disposed thereon, the cap defining an extended portion which penetrates into an aperture defined by the lock member, to so position and hold the lock member relative thereto, the removal of such sealing cap from the air line allowing the lock member to be moved to its second position.

5. The combination of claim 4 wherein the fastener means comprise a plurality of bolts disposed in a substantially circular pattern, and wherein the lock member is substantially circular in configuration.

6. The combination of claim 5 wherein the circular lock member is rotatable to said first and second positions about its axis.

* * * * *